US008479150B2

(12) United States Patent  (10) Patent No.: US 8,479,150 B2
Grechanik et al.  (45) Date of Patent: Jul. 2, 2013

(54) COMPOSITIONAL MODELING OF INTEGRATED SYSTEMS USING EVENT-BASED LEGACY APPLICATIONS

(75) Inventors: Mark Grechanik, Chicago, IL (US); Qing Xie, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 993 days.

(21) Appl. No.: 12/540,739

(22) Filed: Aug. 13, 2009

(65) Prior Publication Data

US 2011/0041117 A1    Feb. 17, 2011

(51) Int. Cl.
*G06F 9/44* (2006.01)
*G06F 17/50* (2006.01)
*G06F 9/45* (2006.01)
*G06F 17/30* (2006.01)

(52) U.S. Cl.
USPC ............... 717/104; 717/105; 703/16; 703/17; 703/22; 707/795; 707/796; 707/803; 707/805; 716/51; 716/55

(58) Field of Classification Search
None
See application file for complete search history.

(56) References Cited

U.S. PATENT DOCUMENTS

| | | | |
|---|---|---|---|
| 5,301,301 A | | 4/1994 | Kodosky et al. |
| 5,907,704 A * | | 5/1999 | Gudmundson et al. ....... 717/100 |
| 6,141,665 A * | | 10/2000 | Hara et al. .................... 715/206 |
| 7,307,640 B2 * | | 12/2007 | Demers et al. ................ 345/584 |
| 8,336,025 B1 * | | 12/2012 | Hosagrahara et al. ........ 717/111 |
| 2001/0045963 A1 * | 11/2001 | Marcos et al. ................. 345/765 |
| 2003/0065527 A1 * | 4/2003 | Yeh et al. ........................... 705/1 |
| 2004/0054690 A1 * | 3/2004 | Hillerbrand et al. ........ 707/104.1 |
| 2005/0119871 A1 * | 6/2005 | Deffler ............................. 703/22 |
| 2006/0168577 A1 * | 7/2006 | Melo et al. ..................... 717/168 |
| 2008/0209356 A1 * | 8/2008 | Grechanik et al. ............. 715/769 |
| 2009/0172589 A1 * | 7/2009 | Brown et al. .................. 715/787 |
| 2010/0325605 A1 * | 12/2010 | Ding et al. ..................... 717/105 |

FOREIGN PATENT DOCUMENTS

EP    1 962 186 A2    8/2008

OTHER PUBLICATIONS

Internet article, "Screen-scraping entry in Wikipedia," http://en.wikipedia.org/wiki/Screen_scraping, Nov. 18, 2009.
Internet article, "Section 508 of the Rehabilitation Act," http://www.access-board.gov/508.htm, Dec. 2, 2009.
Buck et al., "An API for runtime code patching," *Int. J. High Perfor. Comput. Appl.*, 14(4):317-329, 2000.
Burt et al., "*World Class Supply Management: The Key to Supply Chain Management*," McGraw-Hill Irwin, Jul. 2002.
Chen et al., "Web services enabled procurement in the extended enterprise: An architectural design and implementation," *J. Electron. Commerce Res.*, 4(4):140-155, 2003.

(Continued)

*Primary Examiner* — Henry Tsai
*Assistant Examiner* — Michael Sun
(74) *Attorney, Agent, or Firm* — Brinks Hofer Gilson & Lione

(57) ABSTRACT

The compositional event based modeling of integrated applications (CINEMA) tool provides a way to extend a modeling environment using legacy event based applications, such as Graphical User Interface (GUI) APplications (GAPs). CINEMA allows modelers to extend the toolbox of the modeling environment by creating modeling elements that represent GUI objects of GAPs. CINEMA generates source code that allows an integrated system to control and manipulate the GUI objects of GAPs represented by the modeling elements used to create a model of the integrated system.

18 Claims, 8 Drawing Sheets

OTHER PUBLICATIONS

Extended European Search Report dated Dec. 30, 2010 for corresponding European Patent Office Application No. 10 25 1285.2.

Grechanik et al., "Composing Integrated Systems Using GUI-Based Applications and Web Services," Services Computing, 2007, 2007 IEEE International Conference on Services Computing, Piscataway, New Jersey, USA, Jul. 1, 2007, pp. 68-75, XP-031119459.

Grechanik et al., "Integrating and reusing GUI-driven applications," in *ICSR*, pp. 1-16, 2002.

Larus et al., "EEL: Machine-independent executable editing," in *PLDI*, pp. 1-10, 1995.

Miller, R. C., "End-user programming for web users," in *End User Development Workshop, Conference on Human Factors in Computer Systems*, 2003.

Miller et al., "Integrating a command shell into a web browser," in *USENIX Annual Technical Conference, General Track*, pp. 171-182, 2000.

Myers et al., "User interface software technology," *ACM Comput. Surv.*, 28(1):189-191, 1996.

\* cited by examiner

| GUI Object Instantiation Time 604 | Bindings 602 | | |
|---|---|---|---|
| | Active 612 | Passive 614 | Static 618 |
| Past 606 | X | read 620 | read/write |
| Current 608 | read/write/invoke | X 622 | read/write |
| Future 610 | X 624 | write | write |

FIG. 6

| GAP Name, State No | Number of GUI Elements | | | State XML, Bytes | Time, Sec |
|---|---|---|---|---|---|
| | Visible | Invisible | Used | | |
| EA, State 1 | 152 | 23 | 16 | 46,345 | 0.3 |
| EA, State 2 | 152 | 23 | 16 | 47,822 | 0.3 |
| EA, State 3 | 193 | 36 | 28 | 73,339 | 0.4 |
| EA, State 4 | 193 | 36 | 28 | 75,204 | 0.4 |
| EA, State 5 | 152 | 23 | 12 | 46,838 | 0.3 |
| InE, State 1 | 226 | 51 | 35 | 96,018 | 0.5 |
| InE, State 2 | 207 | 46 | 41 | 106,225 | 0.5 |

FIG. 7

COMPOSITIONAL MODELING OF INTEGRATED SYSTEMS USING EVENT-BASED LEGACY APPLICATIONS

BACKGROUND OF THE INVENTION

1. Technical Field

This disclosure relates to a tool for extending a modeling environment using legacy event based applications. In particular, this disclosure relates to a tool that allows modelers to create modeling elements for a modeling environment toolbox from Graphical User Interface (GUI) APplications (GAPs), and generate source code to control and manipulate GUI objects of the GAPs represented by the modeling elements.

2. Background Information

Integrated systems are composed of components that exchange information, also referred to as interoperating components. Components of integrated systems may include different legacy event-based applications such as Graphical User Interface (GUI) APplications (GAPs). Organizations use legacy GAPs to assist business operations to automate business processes, for example, increasing the speed and effectiveness of information exchange.

Organizations find reengineering GAPs into programming components difficult because of brittle legacy architectures, poor documentation, significant programming effort, and subsequently, the large cost of these projects. Because businesses use successful GAPs for decades, managers are reluctant to authorize changes to source code that may break GAPs and disrupt well-established business services. Many organizations explore how to include legacy GAPs in new integrated systems, in order to improve business processes by increasing interoperability of GAPs with new components, such as web services.

Organizations often rely on modelers to develop models of new integrated systems. Modelers may use a unified modeling language (UML) diagramming application (e.g., the ArgoUML™ application) that provides a set of graphical notation techniques to create models that describe a new integrated system. However, modelers find modeling new integrated systems that include GAPs difficult, because many GAPs are closed and monolithic and do not expose any programming interfaces or data in known formats. Although modelers desire to use GAPs as components in integrated systems, modelers find capturing the functionality and interfaces of GAPs as elements of UML-based models (e.g., classes and interfaces) difficult. Modelers find capturing properties of and dependencies between GUI objects a difficult exercise, because GUI models are often unavailable for legacy applications.

Currently, modelers use a manual, laborious, and error-prone process to study GAPs and translate GUI objects into elements of UML as abstractions of the functionalities of these GAPs. Modelers find using GAPs in modeling environments difficult, since many legacy GAPs do not expose any programming interfaces. Modelers find capturing properties of and dependencies between GUI objects a difficult exercise because GUI models are often not available for legacy applications.

Theoretically, GUI models can be extracted from the source code of GAPs, however, two fundamental limitations exist. First, the source code of GAPs often may be unavailable. For example, modeling may be outsourced to external organizations to who the source code of legacy applications may not be shared. Thus, the external organizations do not have the ability to derive precise GUI models from source code. Second, even if the external organization possesses or has access to the source code, limitations that render approaches of deriving GUI models from source code ineffective exist. For example, the Microsoft Windows™ Application Programming Interface (API) call CreateWindow, used in a large number of GAPs, takes a number of parameter variables including a string variable that holds the value of the type of a GUI object, which often may be known only at runtime.

In addition, deriving models from the source code of GAPs depends on knowing the precise semantics of API calls that create and manipulate GUI objects (e.g., CreateWindow), building appropriate parsers and analyzers for languages used to create GUI applications, and developing Integration Development Environment (IDE)-specific tools that extract GUI models from IDE GUI resource repositories. The number of tuples measures in terms of tens of thousands in the Cartesian product of API calls×programming languages×IDEs, increasing the difficulty of identifying an approach that would work with source codebases of different GUI applications.

A fundamental limitation of using GUI objects in UML models is that GUI objects are not programming objects that can be modeled using standard elements of UML. GUI objects are created within corresponding GAPs using the underlying GUI frameworks, and the GUI objects are not part of any modeling environment. Some GUI objects require users to perform multiple actions on GAPs before the GUI objects are instantiated. Without embedding these actions in UML elements, modelers find creating UML models that can be transformed into source code that uses these GUI objects difficult.

GAPs are written in many different languages and run on many different platforms. Many platform and language specific techniques for extracting data from GAPs exist. However, implementing these specific techniques in tools for different modeling platforms and languages results in multiple versions of the source code for the respective tools, increased costs to maintain the tools, and difficulties in maintaining and evolving different codebases.

Finally, modelers find generating source code from UML models that include elements describing GUI objects difficult. Classes that represent GUI objects should contain code that accesses and manipulates these GUI objects, since these GUI objects are created dynamically in the GAPs processes and the contexts of the underlying GUI frameworks (e.g., MS-Windows™ or Java™ SWT—standard widget tool kit). Since models do not reflect the contexts in which GUI objects exist, modelers find maintaining and evolving these models with respective GAPs difficult.

None of the techniques noted about are sufficiently uniform, non-invasive, and efficient. Therefore, a need exists to address the problems noted above and other problems previously experienced.

SUMMARY

ComposItioNal Event-based Modeling of integrated Applications (CINEMA) efficiently and non-invasively extends a UML modeling environment by defining modeling elements for the functionalities of GAPs and GUI objects of GAPs. CINEMA allows a user to model integrated systems that include legacy GAPs by navigating to GUI objects, selecting the GUI objects, and dragging and dropping the GUI objects onto a modeling canvas in order to create models. Because of the wide applicability of CINEMA, CINEMA uses a language-neutral underlying technology common to major computing platforms for controlling and manipulating GAPs. CINEMA disentangles UML modeling environments from GUI structures and hides connections between models and GAPs within CINEMA. CINEMA (1) facilitates users to create models of integrated systems using GAPs, (2) captures the structures and states during user's interactions with the GAP, and (3) specifies the type and the name of GUI objects used in models and subsequently deployed in a resulting integrated system.

CINEMA may be used for data integration, GAP reuse, collaborative computing, and application migration to new platforms. Using CINEMA, modelers expend minimal development efforts to model integrated systems. CINEMA offers, for example, an attractive alternative to rewriting legacy applications by simply reusing the legacy applications in integrated systems. CINEMA provides an efficient and non-invasive way to allow engineers to use existing GAPs to create composite models that CINEMA uses to extend the modeling environment. CINEMA combines a nonstandard use of accessibility technologies for accessing and controlling GAPs. CINEMA extends a UML modeling environment, and allows modelers to create models of integrated systems using the features of GAPs. CINEMA reverses standard modeling direction from requirements to applications (e.g., GAPs to requirements) by allowing engineers to use existing GAPs from which to create composite models.

CINEMA allows a user (e.g., modeler) to model GAPs as programming objects and GUI objects of these GAPs as fields of these programming objects, and perform actions on these programming objects by invoking methods on the programming objects. Unfortunately, integrated systems and modeling environments (IS/MEs) may not access and manipulate GUI objects as pure programming objects, because GUI objects only support user-level interactions. Accessibility technologies expose a special interface whose methods can be invoked and the values of whose fields can be set and retrieved to control the GUI objects.

CINEMA combines a nonstandard use of accessibility technologies in order to access and control GAPs in a uniform way. CINEMA uses a visualization mechanism that enables users to create models of integrated systems composing GUI objects of GAPs by performing point-and-click and drag-and-drop operations on GAPs. CINEMA uses an accessibility layer and hooks to inject event listeners into GAPs. The event listeners respond to events that CINEMA records in order to create modeling elements that extend a UML modeling environment (e.g., Eclipse™ software—released under the Eclipse Public License (EPL) 1.0 open source license).

Accessibility technologies provide different aids to disabled computer users. Some of the aids provided by accessibility technologies include screen readers for the visually impaired, visual indicators or captions for users with hearing loss, and software to compensate for motion disabilities. Most computing platforms include accessibility technologies, since electronic and information technology products and services are required to meet the Electronic and Information Accessibility Standards. For example, Microsoft™ Active Accessibility (MSAA™) technology is designed to improve the way accessibility aids work with applications running on MS-Windows™, and Sun Microsystems™ Accessibility technology assists disabled users who run software on top of the Java Virtual Machine (JVM™). Accessibility technologies are incorporated into computing platforms, as well as libraries, and applications in order to expose information about user interface elements. Accessibility technologies provide a wealth of sophisticated services required to retrieve attributes of GUI objects, set and retrieve values for the GUI objects, and generate and intercept different events. For example, MSAA™ for Windows™ may be used, although, using a different accessibility technology will yield similar results. Although no standard for accessibility Application Programming Interface (API) calls exists, different technologies offer similar API calls, suggesting a slow convergence towards a common programming standard for accessibility technologies. Accessibility technologies exploit the fact that GUI objects expose a well-known interface that exports methods for accessing and manipulating the properties and the behavior of these objects. For example, a MS-Windows™ GUI object that implements the IAccessible™ interface allows the GUI object to be accessed and controlled using MSAA™ API calls. Accessibility technologies allow programmers to write code to access and control GUI objects as standard programming objects. Using accessibility technologies, programmers can also register callback functions for different events produced by GUI objects thereby obtaining timely information about states of the GUI objects. For example, if a GUI object receives an incorrect input and the GAP shows an error message dialog informing the user about the mistake, then a previously registered callback can intercept the event that signals the creation of the error message dialog, dismiss the event, and send an "illegal input" message to the tool and/or programming instructions that control the GAP.

Hooks are user-defined libraries that contain callback functions (or simply callbacks), which are written in accordance with certain rules dictated by accessibility technologies. When a target GAP is started, the accessibility layer loads predefined hook libraries in the process space of the GAP and registers addresses of callbacks that may be invoked in response to specified events. Since hooks "live" in the process spaces of GAPs, the hooks' callbacks can affect every aspect of execution of these GAPs. Hooks enable users to extend the functionality of GAPs, specifically to integrate hooks with GAPs without changing the source code of the GAP. Writing hooks does not require any knowledge about the source code of GAPs. A hook library may be generic for all GAPs. A hook is injected into a GAP, listens to events generated by the GAP, and executes instructions received from integrated systems. As an example instruction, a hook may disable a button until a certain event occurs. Hook libraries allow programmers to change the functionalities of existing GAPs without modifying the source code of the GAPs. The functions of a generic hook include receiving commands to perform actions on GUI objects, reporting events that occur within GAPs, and invoking predefined functions in response to certain commands and events.

Some of the concepts presented above may be described in more detail in the following U.S. patent applications, including: Ser. No. 11/710,681, Publication Number 2008/0209356, entitled "Graphical Unit Interface Based Application to Web Services Conversion System," to Mark Grechanik et al., filed on Feb. 23, 2007; Ser. No. 11/710,233, Publication Number 2008/0209348, entitled "Composing Integrated Systems Using GUI-Based Applications and Web Services," to Mark Grechanik et al., filed on Feb. 23, 2007; Ser. No. 11/710,680, Publication Number 2008/0209446, entitled "Design Tool for Converting Legacy Applications to Web Services," to Mark Grechanik et al., filed on Feb. 23, 2007; Ser. No. 11/888,970, Publication Number 2009/0037896, entitled "Legacy Application Decommissioning Framework," to Mark Grechanik et al., filed on Aug. 2, 2007; Ser. No. 11/824,373, Publication Number 2009/0007066, entitled "Refactoring Monolithic Applications into Dynamically Reconfigurable Applications," to Mark Grechanik et al., filed on Jun. 29, 2007, the entire disclosure of each of these U.S. patent applications of which are hereby incorporated by reference.

CINEMA enables modelers to create models of integrated systems that employ legacy GAPs using a high-degree of automation. Models created using CINEMA may represent integrated systems capable of providing functionality in large-scale distributed enterprise environments that orchestrate different GAPs located on different computers and running on different platforms (e.g., operating systems and system configurations). CINEMA provides a non-invasive way to create models and generate source code to control GAPS. CINEMA allows modelers to create models using GUI objects with only a basic knowledge of how to interact with GAPs in order to accomplish business tasks. CINEMA allows modelers to create models using GUI objects without writing code for the models, knowledge of the source code of components, parsing any source code, and without writing complicated code to change program executables.

Other systems, methods, features and advantages will be, or will become, apparent to one with skill in the art upon examination of the figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 6 illustrates the operations that may be safely performed on a GUI object of a GAP as programming object.

FIG. 7 shows example measurements for the effort expended to create web services using CINEMA.

DETAILED DESCRIPTION OF THE PREFERRED EMBODIMENTS

Figure 1:
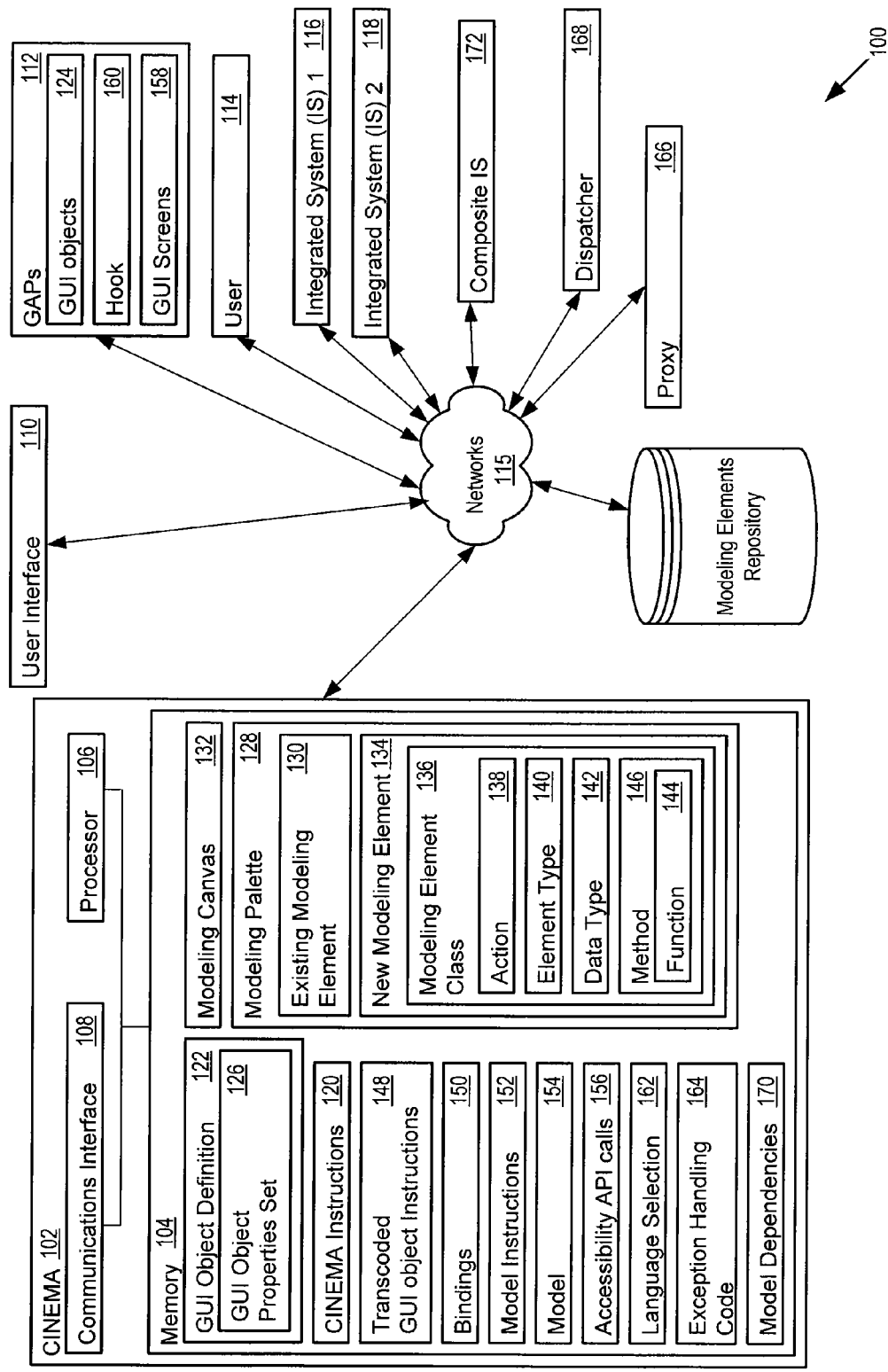
FIG. 1 illustrates an example CINEMA system configuration.

FIG. 1 illustrates a system configuration 100 for a system and tool referred to as CompositioNal Event-based Modeling of integrated Applications (CINEMA) 102 (e.g., a modeling tool) that enables users to model and create inte-grated systems composing GAPs and other programming components (e.g., web services). The CINEMA system configuration 100 includes the CINEMA system 102, which includes a memory 104 coupled to a processor 106, communicating through a communication interface 108 to components of the CINEMA system configuration 100. The CINEMA system configuration 100 further includes a user interface 110, GAPs 112, users 114 (e.g., modelers), integrated systems (e.g., 116 and 118) and composite integrated systems 172 (e.g., compose GAPs 112 and integrates systems such as 116 and 118).

The memory 104 stores compositional event-based modeling (CINEMA) instructions 120 that when executed by the processor 106 cause the processor to receive, through the user interface 110, a graphical user interface (GUI) object definition 122 of a GUI object 124 of an external GUI application (GAP) 112. The user 114 selects the GUI object 124 from the external GAP 112. The GUI object definition 122 includes a GUI object properties set 126.

In one implementation, CINEMA 102 may invoke the external GAPs 112. The external GAPs 112 are separate from CINEMA 102. In other words, the external GAPs 112 may run without CINEMA 102 running and/or without CINEMA 102 invoking the external GAPs 112. In one implementation, external GAPs 112 run in a separate process space and shares no variables with CINEMA 102. In another implementation, external GAPs 112 run in the process space of CINEMA 102 when CINEMA 102 invokes the external GAPs 112. In still another implementation, the user 114 may configure CINEMA 102 to operate with external GAPs 112 running in one of three isolation modes, including a low isolation, medium isolation, and high isolation mode. In the low isolation mode, an external GAP 112 runs in the same process space as CINEMA 102 when CINEMA 102 invokes the external GAPs 112. In the medium mode, multiple GAPs 112 run in one process space, while CINEMA 102 runs in a separate process space. In the high isolation mode, each of the multiple GAPs 112 run in separate process spaces, and CINEMA 102 runs in still another separate process space. The user 114 may select the isolation mode based on the system computing resources available to the CINEMA system configuration 100 and/or the particular GAPs 112 the user 114 desires to use for modeling.

CINEMA 102 includes a modeling element palette 128 that includes an existing modeling element 130, and a modeling canvas 132. CINEMA 102 allows the user 114 to create, in the modeling element palette 130, a new modeling element 134 from the GUI object definition 122 by generating a modeling element class 136 for the GUI object 124 to obtain the new modeling element 134. CINEMA 102 generates the modeling element class 136 by defining an action 138 performed by the GUI object 124, a modeling element type 140, a data type 142, and a function 144 performed by a method 146 of the GUI object 124. In one implementation, the user 114 defines the action 138, element type 140, data type 142, and function 144 for the modeling element class 136 for the new modeling element 134. In one implementation, CINEMA 102 generates the new modeling element 134 by transcoding the GUI object definition to obtain a modeling element representation for the GUI modeling element.

CINEMA 102 generates code that mimics a human-driven procedure of interacting with the GAPs 112, referred to as transcoding. CINEMA 102 transcodes the GUI object properties set 126 into transcoded GUI object instructions 148 (e.g., programming instructions) that a resulting integrated system and/or composite integrated system (e.g., 116, 118 and 172) may execute to control and manipulate GUI objects 124 of GAPs 112. In one implementation, the compositional event-based modeling instructions 120 cause the processor to transcode the GUI object properties set 126 to obtain transcoded GUI object instructions 148 configured to locate, manipulate and control the GUI object 124. CINEMA 102 may also generate exception handling code that handles exceptions that may be thrown while controlling GAPs 112 (e.g., showing a message box informing users about incorrectly formatted input). The compositional event-based modeling instructions 120 may further cause the processor to bind 150 the transcoded GUI object instructions 148 to obtain processor 106 executable model instructions 152 that cause the processor 106 to manipulate the GUI object 124 according to a model 154 created using the new modeling element 134.

Figure 8:
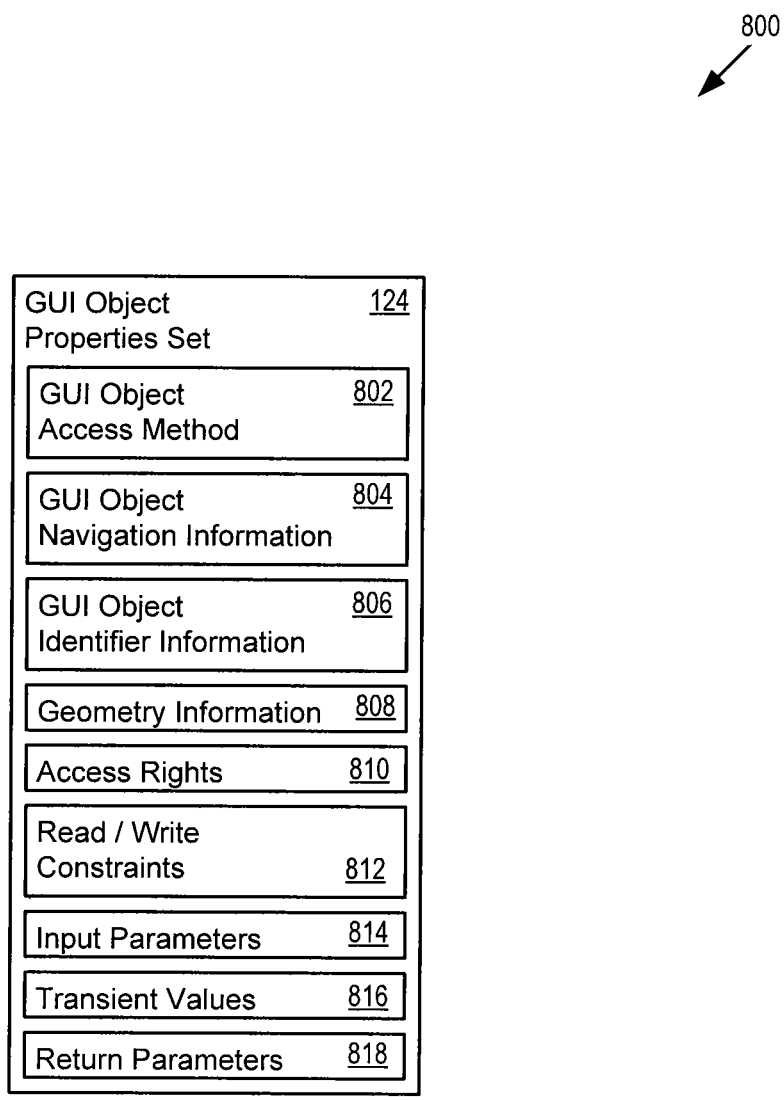
FIG. 8 shows an example GUI Object Properties Set.

Referring briefly to FIG. 8, the GUI object properties set 126 includes: a GUI object access method 802 that determines how to access the GUI object 124, and GUI object navigation information 804 that captures how to navigate to the GUI object 124 in the GAP 112. The GUI object properties set 126 further includes: GUI object identifier information 806; geometry information 808; access rights 810; read and write constraints 812; input parameters 814; transient values 816; and return parameters 818. In one implementation, CINEMA 102 transcodes the GUI object properties set 126 in order to create the new modeling element 134 and generates programming instructions (e.g., transcoded GUI object instructions 148) for an integrated system and/or composite integrated system (e.g., 116, 118 and 172) to use to control and manipulate GAPs 112 and other components (e.g., web services and other GAPs), discussed in detail below.

Returning to FIG. 1, the GUI object properties set 126 provides CINEMA 102 information about the structure of the GAP 112 and the GUI object 124 using accessibility-enabled interfaces 156 (e.g., accessibility API calls), that CINEMA 102 records while the user 114 interacts (e.g., user interactions) with the GAP 112, GUI object 124, and the sequence of GUI screens 158 of the GAP 112. In one implementation, CINEMA 102 uses the accessibility API calls 156 and hooks 160 (e.g., event listeners) in GAPs 112 to receive the GUI object properties set 126. The hooks 160 respond to events that CINEMA 102 captures as the GUI object properties set 126. Discussed in further detail below, CINEMA may use the GUI object properties set 126 to generate source code (e.g., model instructions 152) of a chosen programming language (e.g., language selection 162) from the model 154, and compile and execute the source code (e.g., model instructions 152). CINEMA 102 may generate exception handling code 164 that handles exceptions that may be thrown while controlling GAPs 112 (e.g., showing a message box informing users about incorrectly formatted input) using the model instructions 152.

Table 1 shows how CINEMA 102, in one implementation, creates a GUI object class (e.g., new modeling element 134) for a GUI object 124.

TABLE 1

Create a GUI Object Class (e.g., a New Modeling Element)

```
/** Reference refers to a GAP from which CINEMA creates a new GUI object class
(e.g., new modeling element) **/
public   class   Reference   implements   CINEMAEventProvider<Reference>,
CINEMAEventListener<SmartClass>, IPropertySource {
    /**
     * Suffix for service class name bindings.
     */
    private static final String CLASS_NAME_SUFFIX = "";
    /**
     * Package prefix for generated services.
     */
    private static final String PACKAGE_PREFIX =
                                    "com.companyABC.techlabs.smart";
    private static final String PROPERTY_NAME = "PROPERTY_NAME";
    private static final String PROPERTY_HOST = "PROPERTY_HOST";
    private static final String PROPERTY_PORT = "PROPERTY_PORT";
    private static final String PROPERTY_DESCRIPTION =
                                    "PROPERTY_DESCRIPTION";
    private static final Logger LOGGER = Logger.getLogger(Reference.class);
    /**
     * Determines if a proposed service name is valid.
     *
     * @param name
     * The proposed name of the service.
     *       @return True if the service name is valid; false otherwise.
     */
    public static boolean isValidReferenceName(String name) {
        boolean valid = false;
        if (name != null) {
            if (name.length( ) > 0 && !"".equals(name)) {
                // verify that we have a valid name
                RegularExpression regEx = new RegularExpression("^[A-Z]{1}[A-Za-z0-9]*$");
                if (regEx.matches(name)) {
                    valid = true;
                }
            }
        }
        return valid;
    }
    /**
     * The description of the reference.
     */
    private String description_;
    /**
     * Delegate that handles property change events.
     */
```

TABLE 1-continued

Create a GUI Object Class (e.g., a New Modeling Element)

```
    private   SmartEventProviderHelper<Reference>  eventProvider__ = new
SmartEventProviderHelper<Reference>( );
/**
 * The reference's CINEMA host.
 */
private String host__ = null;
/**
 * The name of the reference.
 */
private String name__ = null;
/**
 * A list of classes available on this reference.
 */
private List<SmartClass> smartClasses__ = new ArrayList<SmartClass> ( );
private Application application__;
/**
 * The port of the CINEMA host.
 */
private int port__ = −1;
/**
 * List of property descriptors.
 */
private IPropertyDescriptor[ ] propertyDescriptors__;
/**
 * Create an instance of Reference.
 *
 * @param name
 *       The name of the reference.
 * @param description
 *       The description of the service.
 * @param host
 *       The host to connect to.
 * @param port
 *       The port to connect on.
 */
public Reference(String name, String description, String host, int port) {
   name__ = name;
   description__ = description;
   host__ = host;
   port__ = port;
}
public Reference(String name, String description) {
     name__ = name;
     description__ = description;
}
/** {@inheritDoc} */
public void addEventListener(CINEMAEventListener<Reference> listener) {
   eventProvider__.addEventListener(listener);
}
/**
 * Creates a new smart class on this reference.
 *
 * @return The new smart class.
 */
public SmartClass createClass( ) {
   String className = "Screen" + (smartClasses__.size( ) + 1);
   LOGGER.debug("createClass( ) name: " + className);
   SmartClass smartClass = new SmartClass(this, className);
   smartClasses__.add(smartClass);
   if (application__ != null) {
      application__.addSmartClass(smartClass);
   }
   LOGGER.debug("smart class created: " + smartClass);
   notifyListeners( );
   return smartClass;
}
public Application getApplication( ) {
     return application__;
}
public void setApplication (Application app) {
     application__ = app;
}
/**
 * Gets the class name for this reference.
 *
 * @return The class name for this service.
 */
public String getClassName( ) {
```

TABLE 1-continued

Create a GUI Object Class (e.g., a New Modeling Element)

```
      return this.getName( ) + CLASS_NAME_SUFFIX;
   }
   /**
    * Gets the description of the service.
    *
    * @return the description of the service.
    */
   public String getDescription( ) {
      return description_;
   }
   /**
    * Gets the value of host.
    *
    * @return the host
    */
   public String getHost( ) {
      return host_;
   }
   /**
    * Gets the name of the service.
    *
    * @return The name of the service.
    */
   public String getName( ) {
      String name = name_;
/*    if (getSmartClasses( ) != null && getSmartClasses( ).get(0) != null) {
         name = getSmartClasses( ).get(0).getName( );
      }
*/
      return name;
   }
   /**
    * Creates an iterator over the list of operations in this service.
    *
    * @return Returns an iterator of the operations.
    */
   public List<SmartClass> getSmartClasses( ) {
      return new ArrayList<SmartClass>(smartClasses_);
   }
   /**
    * Gets the package name for this service.
    *
    * @return The Java package name for this service.
    */
   public String getPackageName( ) {
      return PACKAGE_PREFIX;
   }
   /**
    * Gets the value of port.
    *
    * @return the port
    */
   public int getPort( ) {
      return port_;
   }
   /**
    * Determines if the service can be published or not.
    *
    * @return True if the service and its operations are in a publishable
    *         state; False otherwise.
    */
   public boolean isPublishable( ) {
      boolean readyToPublish = true;
      // must have a none null service name
      if (getName( ) == null || getName( ).length( ) == 0) {
         readyToPublish = false;
      }
      // make sure that each operation is publishable
      if (smartClasses_ != null && smartClasses_.size( ) > 0) {
         for (SmartClass theClass : smartClasses_) {
            readyToPublish = readyToPublish & theClass.isPublishable( );
         }
      } else {
         readyToPublish = false;
      }
      return readyToPublish;
   }
   /** {@inheritDoc} */
```

TABLE 1-continued

Create a GUI Object Class (e.g., a New Modeling Element)

```
public void propertyChanged(SmartClass model) {
    // when the underlying operations change, the service changed!
    notifyListeners( );
}
/** {@inheritDoc} */
public void removeEventListener(CINEMAEventListener<Reference> listener) {
    eventProvider_.removeEventListener(listener);
}
/**
 * Removes the class from the reference.
 *
 * @param theClass
 *         The smart class to remove.
 */
public void removeClass(SmartClass theClass) {
    if (theClass != null) {
        smartClasses_.remove(theClass);
    }
    notifyListeners( );
}
/**
 * Sets the description of the service.
 *
 * @param description
 *         The description of the service.
 */
public void setDescription(String description) {
    if (description_ != description && !description_.equals(description)) {
        description_ = description;
        notifyListeners( );
    }
}
/**
 * Set the value of host.
 *
 * @param host
 *         The host to set.
 */
public void setHost(String host) {
    host_ = host;
}
/**
 * Set the value of name.
 *
 * @param name
 *         The name to set.
 */
public void setName(String name) {
    if (name_ == null || !name_.equals(name)) {
        if (isValidReferenceName(name)) {
            name_ = name;
            notifyListeners( );
        } else {
            throw new IllegalArgumentException(generateInvalidReferenceNameMessage(name));
        }
    }
}
/**
 * TODO Describe method generateInvalidServiceNameMessage.
 *
 * @param name
 * @return
 */
private String generateInvalidReferenceNameMessage(String name) {
    return "Service names must start with a capital letter and may only contain alphanumeric characters.";
}
/**
 * Set the value of port.
 *
 * @param port
 *         The port to set.
 */
public void setPort(int port) {
    port_ = port;
}
/**
```

TABLE 1-continued

Create a GUI Object Class (e.g., a New Modeling Element)

```
 * Notifies all service listeners that an event has occurred.
 */
private synchronized void notifyListeners( ) {
   eventProvider_.notifyListeners(this);
}
/** {@inheritDoc} */
public Object getEditableValue( ) {
   // TODO Auto-generated method stub
   return null;
}
/** {@inheritDoc} */
public IPropertyDescriptor[ ] getPropertyDescriptors( ) {
   if (propertyDescriptors_ == null) {
      PropertyDescriptor nameDescriptor =
                  new PropertyDescriptor(PROPERTY_NAME, "Name");
      nameDescriptor.setDescription("The name of the reference.");
      nameDescriptor.setCategory("Reference");
      nameDescriptor.setAlwaysIncompatible(true);
      PropertyDescriptor descDescriptor =
            new PropertyDescriptor(PROPERTY_DESCRIPTION, "Description");
      descDescriptor.setDescription("The description of the reference.");
      descDescriptor.setCategory("Reference");
      descDescriptor.setAlwaysIncompatible(true);
      propertyDescriptors_ = new IPropertyDescriptor[ ] {
         nameDescriptor, descDescriptor
      };
   }
   return propertyDescriptors_;
}
/** {@inheritDoc} */
public Object getPropertyValue(Object id) {
   if (PROPERTY_NAME.equals(id)) {
      return getName( );
   } else if (PROPERTY_DESCRIPTION.equals(id)) {
      return getDescription( );
   } else if (PROPERTY_HOST.equals(id)) {
      return getHost( );
   } else if (PROPERTY_PORT.equals(id)) {
      return getPort( );
   }
   return null;
}
/** {@inheritDoc} */
public boolean isPropertySet(Object id) {
   // TODO Auto-generated method stub
   return false;
}
/** {@inheritDoc} */
public void resetPropertyValue(Object id) {
   // TODO Auto-generated method stub
}
/** {@inheritDoc} */
public void setPropertyValue(Object id, Object value) {
   if (PROPERTY_NAME.equals(id)) {
      if (value instanceof String) {
         setName((String) value);
      }
   } else if (PROPERTY_DESCRIPTION.equals(id)) {
      if (value instanceof String) {
         setDescription((String) value);
      }
   }
}
/**
 * TODO Describe method update.
 */
public void update( ) {
   notifyListeners( );
}
}
```

Figure 2:
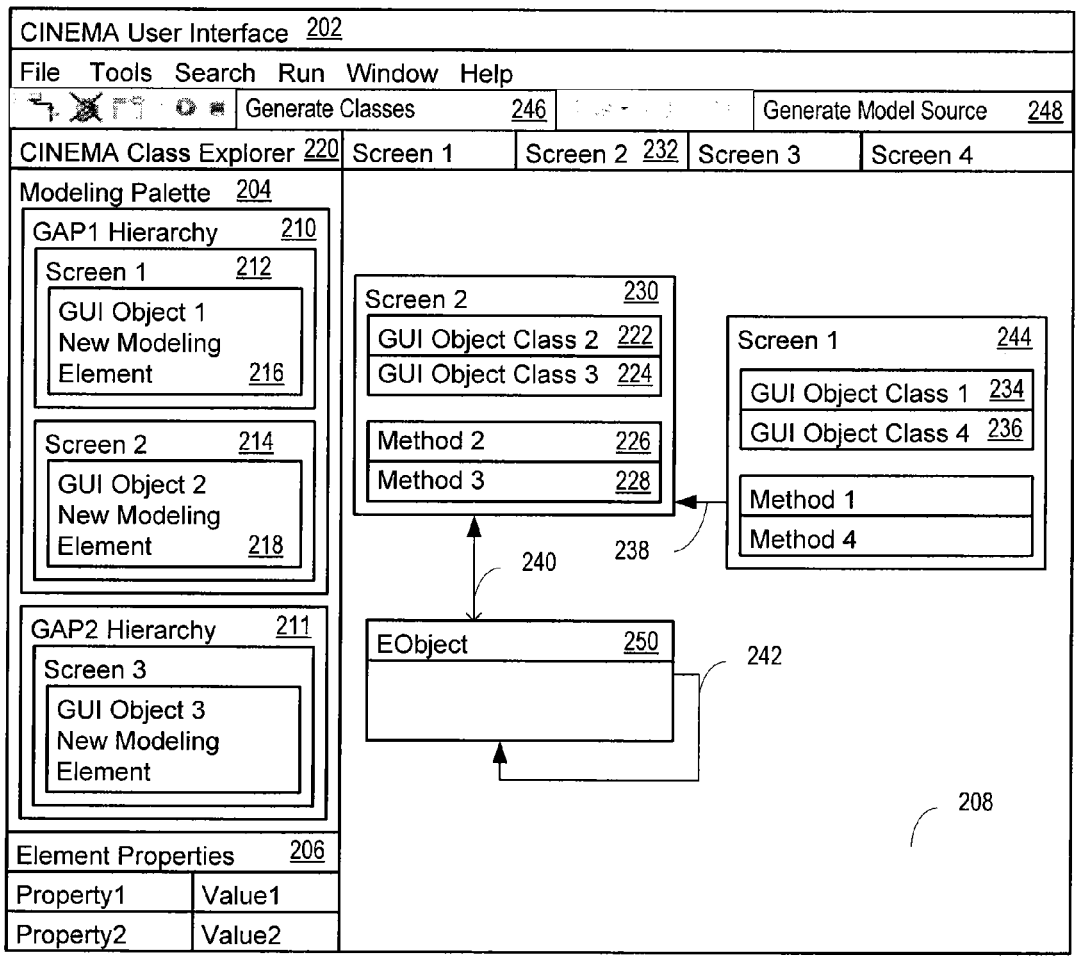
FIG. 2 illustrates the CINEMA user interface (CINEMA UI).

FIG. 2 illustrates the CINEMA user interface (CINEMA UI) 200. The CINEMA UI 200 includes a tool bar 202, modeling palette 204, element properties 206 areas, and modeling canvas 208. The CINEMA instructions 120 cause the processor 106 to display, in a graphical user interface (e.g., CINEMA UI 200), the model 154 in the modeling canvas 208. In one implementation, CINEMA 102 uses the GUI object properties set 126 to display in the modeling palette 204 a structural representation (e.g., GAP1 hierarchy 210 and GAP2 hierarchy 211) of GAPs 112. The GAP hierarchy 210 includes graphical representations of the GUI screens 158 (e.g., 212 and 214) and GUI objects 124 within each GUI screen 158 (e.g., new modeling elements 216 and 218). CINEMA 102 may display the modeling palette 204 when the user selects the CINEMA class explorer 220. CINEMA 102 uses the GUI object properties set 126 to generate GUI object classes 136 (e.g., 222 and 224) for the GUI objects 124.

Table 2 shows an example of how CINEMA 102, in one implementation, captures operations (e.g., functions and/or methods) for a new modeling element 134 for a GUI object 124. CINEMA 102 identifies the GAP 112 (e.g., state machine) and GUI object 124 from which the user 114 captures operations for a new modeling element 134 (e.g., referred to as className in Table 2 and Table 3 below). The user 114 performs actions on the GUI object 124 in order to capture the operations (e.g., functions and/or methods) for the new modeling element 134. The user 114 drags and drops the GUI object 124 onto the modeling canvas 132 and CINEMA creates the new modeling element 134 in the modeling palette 128.

TABLE 2

Capture Operations for a New Modeling Element

```
/** SmartClass captures the operations (e.g., function and/or method) of a GUI object
for a new modeling element. **/
    private List<DragAndDrop> dragAndDropElements__ =
                                    new ArrayList<DragAndDrop> ( );
    private Reference reference__;
    /**
     * The GAP (e.g., state machine) that enables the operation of interest
     */
    private List<ApplicationStateMachine> stateMachines__ =
                                    new ArrayList<ApplicationStateMachine>( );
    private List<Parameter> variables__;
    /**
     * A list of methods for the class
     */
    private List<Method> methods;
    public SmartClass(Reference reference, String className) {
        if (!isValidClassName(className)) {
            throw new IllegalArgumentException("The name [" + className + "] "
                + "is not valid. SmartClass names must start with a letter and"
                + " may only contain alphanumeric characters.");
        }
        name__ = className;
        reference__ = reference;
        variables__ = new ArrayList<Parameter>( );
        // add the default void return type
        Parameter defaultReturn = new Parameter("", "void", ParameterUsage.Return);
        variables__.add(defaultReturn);
    }
    /**
     * Adds the specified action to the list of actions to be performed as a
     * part of this operation.
     *
     * @param application
     *        The application on which to perform the action.
     * @param action
     *        The action to perform.
     */
    public void performAction(Application application, ApplicationAction action) {
        ApplicationStateMachine stateMachine =
                                    getStateMachineForApplication(application);
        if (stateMachine != null) {
            stateMachine.performAction(action);
            notifyListeners( );
        }
    }
    public void performAction(Application application, ApplicationGuiElement element)
    {
        ApplicationStateMachine stateMachine =
                                    getStateMachineForApplication(application);
        DragAndDrop dragElement = (DragAndDrop) element;
        addDragAndDropElements(dragElement);
        if (stateMachine != null) {
//              stateMachine.performAction(new ApplicationAction(dragElement,
dragElement.getAction( )));
                if (dragElement.getFunctions( ).indexOf(Function.ActionProducer) != -1
|| dragElement.getFunctions( ).indexOf(Function.InputDataAcceptor) != -1) {
                    //send action to engine
                    stateMachine.performAction(new
                        ApplicationAction(dragElement, dragElement.getAction( )));
            Display.getDefault( ).asyncExec(new Runnable( ) {
                /** {@inheritDoc} */
                public void run( ) {
                    try {
                        SmartClass theClass =
                                    SmartPalette.getCurrentReference( ).createClass( );
```

TABLE 2-continued

Capture Operations for a New Modeling Element

```
                SmartPalette.getDispatcher( ).setSmartClass(theClass);
                // open the editor
                IEditorInput input = SmartScreenEditorInput.createInput(theClass);
                IDE.openEditor(PlatformUI.getWorkbench( ).getActiveWorkbenchWindow( ).getActive
Page( ), input, SmartScreenEditor.ID);
theClass.addApplication(SmartPalette.getCurrentReference( ).getApplication( ));
                // wait a moment...
                synchronized (this) {
                    try {
                        this.wait(1000);
                    } catch (InterruptedException e) {
                        // TODO Auto-generated catch block
                        e.printStackTrace( );
                    }
                }
            } catch (PartInitException e) {
        MessageDialog.openError(PlatformUI.getWorkbench( ).getActiveWorkbenchWindow( ).getShell( ),
"Error", "Error opening view:" + e.getMessage( ));
            }
        }
     });
            //performStateTransition( );
    }
        notifyListeners( );
    }
}
/**
 * Performs a state transition by taking the set of actions on the current
 * state, performing them, and recording the new state of the application.
 */
public void performStateTransition( ) {
    if (stateMachines_ != null) {
        for (ApplicationStateMachine stateMachine : stateMachines_) {
//          stateMachine.performStateTransition(dispatcher_);
            stateMachine.performStateTransition(getDispatcher( ));
        }
    }
    notifyListeners( );
}
    public List<DragAndDrop> getDragAndDropElements( ) {
        return dragAndDropElements_;
    }
    public void addDragAndDropElements(DragAndDrop element) {
        boolean matchedElement = false;
        for (DragAndDrop element_ : dragAndDropElements_) {
            if (element.getUniqueId( ).equals(element_.getUniqueId( ))) {
                matchedElement = true;
                break;
            }
        }
        if (!matchedElement)
            dragAndDropElements_.add(element);
    }
```

Figure 3:
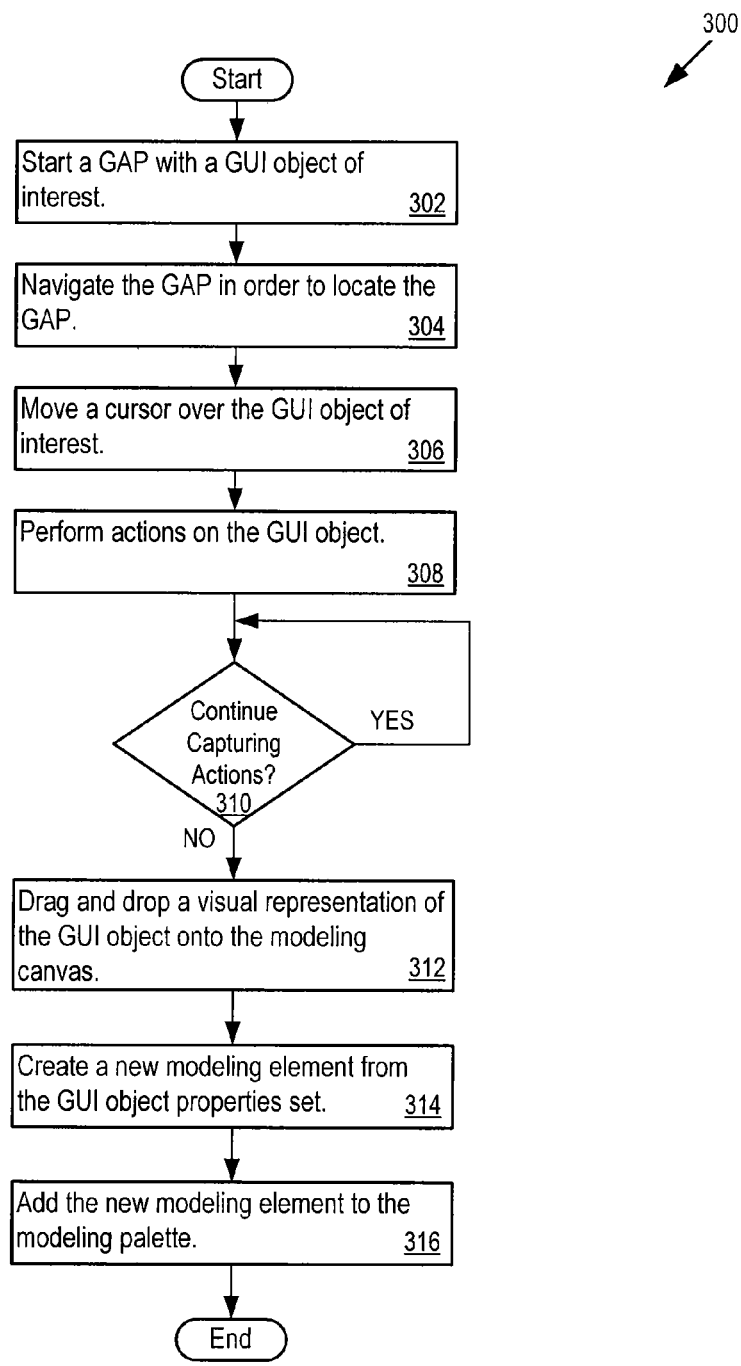
FIG. 3 illustrates the logic flow CINEMA may take to create a new modeling element using a GUI object of a GAP.

FIG. 3 illustrates the logic flow CINEMA 102 may take to create a new modeling element 134 (e.g., 216 and 218) from a GUI object of a GAP 112. When the user 114 starts CINEMA 102, the user 114 and/or CINEMA 102 may also start a GAP 112 that includes a GUI object 124 of interest from which the user 114 creates a new modeling 134 (e.g., 216 and 218) (302). When the user 114 starts the GAP 112 from CINEMA 102, CINEMA 102 starts a listener (e.g., proxy 166) and dispatcher (168), in communication with a hook 160 injected in GAP 112, in order to capture information and control the GUI object 124. The user 114 navigates the GUI screens 158 of the GAP 112 in order to locate the GUI object 124 (304). In one implementation, the user 114 moves a cursor over a GUI object 124 of a GAP 112 (306). The user 114 performs actions on the GUI object 124 so that CINEMA may capture the operations and transition states that occur for the GUI object 124 (308) (310). CINEMA 102 uses accessibility API calls 156 to obtain information (e.g., GUI object properties set 126) about the GUI object 124. CINEMA 102 receives and/or captures actions (e.g., the operations and transition states) that describe states of the GAP 112. CINEMA 102 generates a GUI object class (e.g., 136, 222, and 234). The GUI object class (e.g., 136, 222, and 234) includes methods (e.g., 146 and 226) that control the GAP 112 and GUI object 124 by setting and getting values of the GUI objects 124 and cause actions that enable the GAP 112 to switch to different states. In order to confirm the selection of a GUI object 124, the user 114 may draw a frame around the GUI object 124 with a tooltip window displaying the information (e.g., GUI object properties set 126) about the selected GUI object 124. The user 114 then drags the GUI object 124 (e.g., a visual image representation of the GUI object 124) onto the modeling canvas 208 (312). When the user 114 drags and drops the GUI objects 124 onto the modeling canvas, CINEMA 102 creates a new modeling element 134 (e.g., 216 and 218). The new modeling element 134 (e.g., 216 and 218)

includes attributes that hold information about locating and controlling the GUI object 124 in the corresponding GAP 112 (314). CINEMA 102 adds the new modeling element 134 (e.g., 216 and 218) to the modeling palette 128 (e.g., 204) so that the new modeling element may be used to create models 154.

Figure 4:
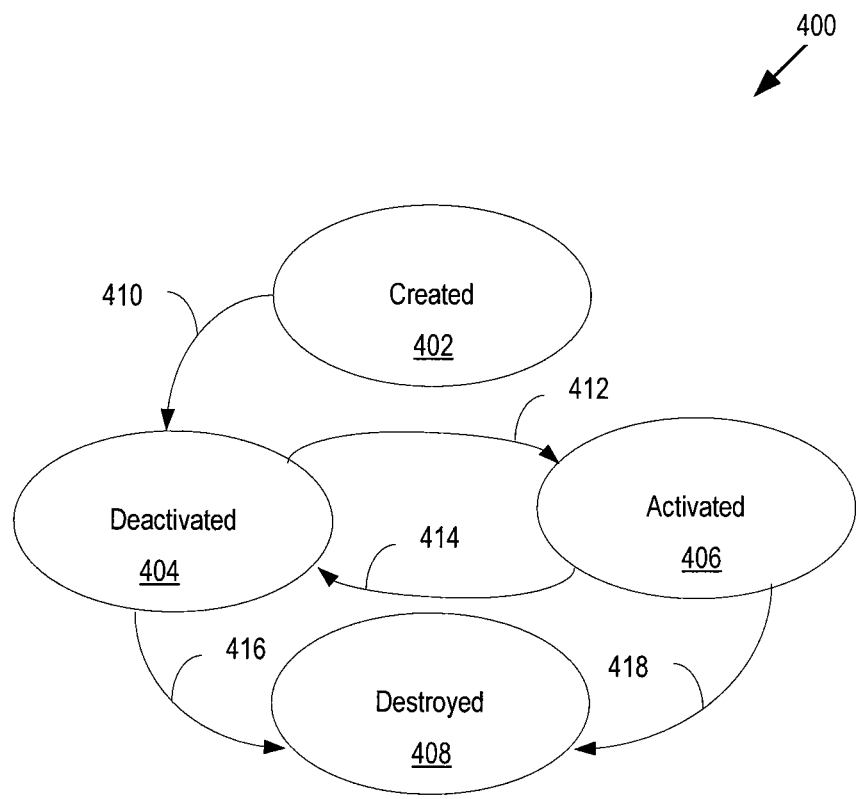
FIG. 4 shows a state diagram for the lifecycle of a GUI object.

FIG. 4 illustrates a state diagram 400 for the lifecycle of a GUI object 124. CINEMA 102 receives and/or captures actions (e.g., the operations and transition states) that describe states of the GAP 112. FIG. 4 shows the GUI object states (e.g., e.g., 402, 404, 406 and 408) of a GUI object 124 as ovals and transitions (e.g., 410, 412, 414, 416 and 418) between the GUI object states as arrows. Within a GUI framework, GAPs 112 represent GUI objects 124 internally as data structures whose records specify values of properties of the GUI objects 124. Under the GUI object state created 402, a GAP allocates a record for the GUI object and initializes the fields of the GUI object 124 to some values. In the created 402 GUI object state, a user may not access the GUI object 124. The state of the GUI object 124 transitions (e.g., 410) from the GUI object state created 402 to the GUI object state deactivated 404.

Under the GUI object state activated 406, the GUI object may be visible and available for user interactions. The GUI object 124 may transition (e.g., 412 and 414), between the GUI object states deactivated 404 and activated 406, an indefinite number of times during the lifetime of the GUI object 124. For example, going back and forth between multiple screens (e.g., 158) in a GAP 112 hides (deactivates) one screen containing GUI objects 124 and activates another screen. Switching between the GUI object states deactivated 404 and activated 406 may not change the values that the GUI object 124 holds. Even so, a user 114 may not act on the GUI object 124 in the GUI object state deactivated 404. The GUI object state may transition (e.g., 416 and 418) to destroyed 408, for example when the GAP stops. CINEMA 102 receives and/or captures actions (e.g., the operations and transition states) that describe the states of the GAP 112 in order to determine how the new modeling element 134 may be used in a model 154.

Referring briefly to FIG. 2, the user 114 may model a particular screen 230 for the model 154 by selecting a corresponding screen 232 tab in the CINEMA UI 200. CINEMA UI 200 displays the modeling canvas 208 that corresponds to the screen the user 114 desires to design for the model 154. The user 114 may specify the functions 144 that each GUI object 124 performs in the model 154. For example, the user 114 may specify which GUI objects (e.g., 222 and 224) receive values and/or serve as inputs and which GUI objects produce output results (e.g., 234 and 236). Using CINEMA 102, a user 114 creates a model 154 using the modeling elements (e.g., 216 and 218) by dragging and dropping the modeling elements (e.g., 216 and 218) onto the modeling canvas 208. FIG. 2 shows a diagrammatic representation of the new modeling elements (e.g., 216 and 218) as object classes (e.g., 234 and 222, respectively). The user 114 connects the modeling elements (e.g., object classes 234 and 222) using connectors (e.g., 238, 240, 242) that specify dependencies between the modeling elements (e.g., object classes). When the user 114 completes the model 154, the user 114 may generate model instructions 152 that cause the processor 106 to manipulate the GUI object 124 according to a model 154 created using the new modeling element 134.

Figure 5:
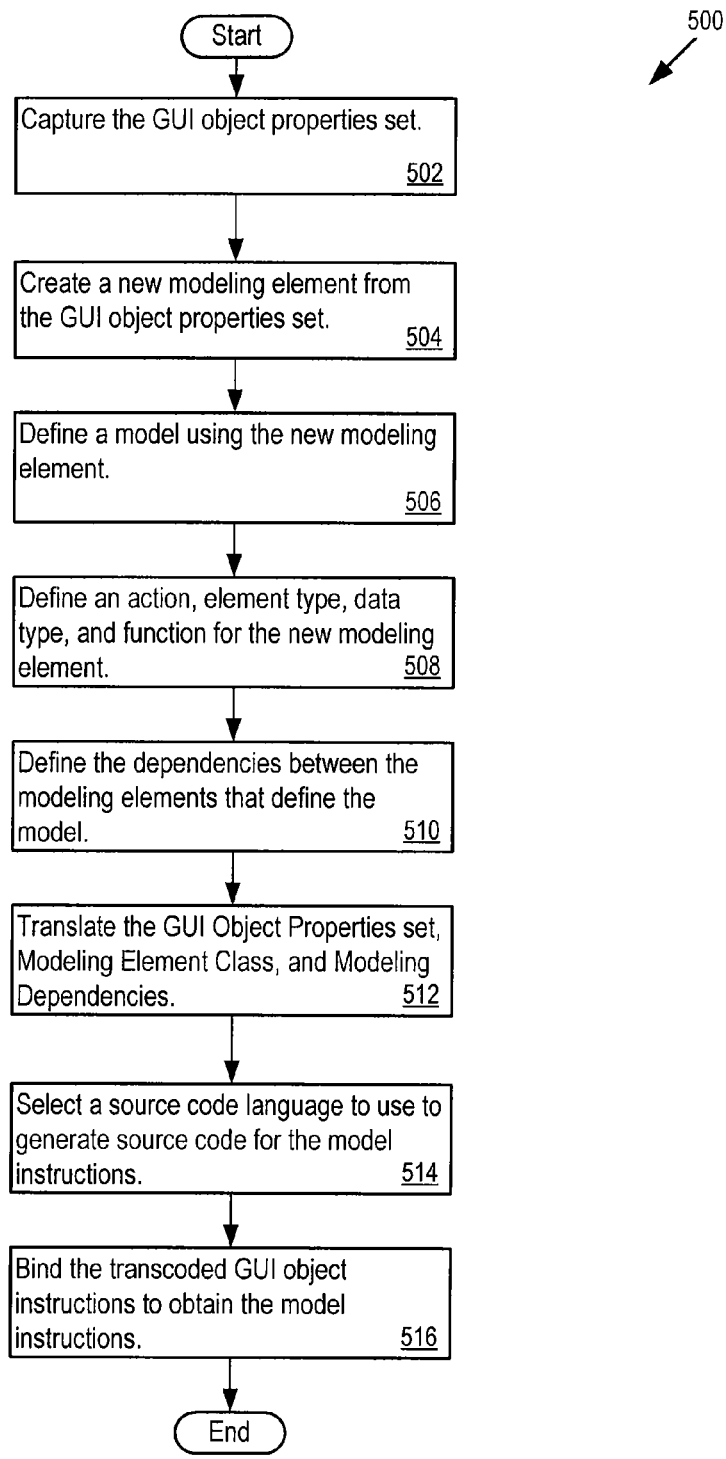
FIG. 5 illustrates the logic flow CINEMA may take to generate processor executable model instructions for a GUI object of a GAP according to a model.

FIG. 5 illustrates the logic flow CINEMA 102 may take to generate processor executable model instructions 152 for a GUI object 124 according to a model 154. CINEMA 102 uses accessibility API calls 156 to obtain information (e.g., the GUI object properties set 126) about the GUI object 124 (502). CINEMA 102 creates a new modeling element 134 from the GUI object properties set 126 for the GUI object 124 (504). The user 114 defines a model 154 using the new modeling element 134 (506) by placing the new modeling element 134 on the modeling canvas 208. Through the CINEMA UI 200, the user 114 defines an action 138, element type 140, a data type 142, and function 144 for the modeling element class 136 for the new modeling element 134 (508). In the event the model 154 includes multiple modeling elements (e.g., the new modeling element 134 and an existing modeling element 130), the user 114 defines dependencies (e.g., shown as connectors 238 and 240 on the modeling canvas 208) between the modeling elements (e.g., 234 and 222) (510) by placing modeling connectors (e.g., 238 and 240) between the modeling elements in the modeling canvas 208, and/or placing a modeling connector (e.g., 242) on an individual modeling element 250.

CINEMA 102 generates code that mimics a human-driven procedure of interacting with the GAPs 112, referred to as transcoding. In one implementation, compositional event-based modeling instructions 120 use the GUI object properties set 126, the modeling element class 136 and modeling dependencies 170 to transcode the new modeling element 134 into programming instructions (e.g., transcoded GUI object instructions 148) (512). An integrated system and/or composite integrated system (e.g., 116, 118 and 172) may execute the transcoded GUI object instructions to locate, control and manipulate GUI objects 124 of GAPs 112.

CINEMA 102 records the states of a GAP 112 using the hook 160, listener (e.g., proxy 166) and dispatcher 168. GAPs 112 may be represented by a tree structure that includes GUI screens 158 and GUI objects 124 within each GUI screen 158, along with the attributes of each GUI screen 158 and GUI object 124, and GUI object 124 functions (e.g., methods). CINEMA 102 traverses the GUI tree of the GAP 112 post-order, using accessibility technology, in order to capture the GUI object properties set 126. For each node of the GUI tree of the GAP 112, CINEMA 102 emits code for a GUI object class (e.g., 222 and 224) for a GUI object 124. A user 114 may retrieve data from and enter data into the GUI objects 124 of the GAP 112. The user may initiate transitions (e.g., GUI object state changes) by causing some actions (e.g., select a menu item or click on a button). A GAP 112 may perform some computations based on the user's 114 actions and present different GUI screens 158. The user 114 may continue the cycle until the user 114 has allowed CINEMA 102 to capture all the desired actions of the GAP 112.

Table 3 shows a declaration of a transcoded GUI object class (e.g., 222 and 224) for a GUI object 124. CINEMA 102 links generated GUI object classes (e.g., 136, 222 and 224) to GUI objects 124. The transcoded GUI object instructions 148 may include a GUI object class declaration, as shown in Table 3. The GUI object class declaration includes methods for locating the given GUI object 124 in the GAP 112, setting and getting the values for the GUI object 124, and performing an action on the GUI object 124. GUI objects 124 include semantically meaningful types of the data that users 114 use to model the GUI objects 124 as new modeling elements 134 (e.g., 216 and 218). CINEMA 102 allows users 114 to type GUI objects 124 and bind names to the GUI objects 124. Using CINEMA, a user 114 captures the properties of GUI objects 124 and assigns names and types to the GUI objects 124. For example, a user 114 may assign different names but the same type to different GUI objects 124 that hold values of the same semantic concept (e.g., addresses or credit card numbers) even though the GUI objects 124 may be hosted by different GAPs 112.

TABLE 3

An example Declaration of a GUI Object Class

Line 1  public class ClassName {
Line 2      private int ElementId = 0x41;
Line 3      private void Locate ( int ProcId ) { ... }
Line 4      ClassName( int ProcId ) {
Line 5          Locate(ProcId);... }
Line 6      public void Set ( type var ) { ... }
Line 7      public type Get( ) { ... }
Line 8      public void DoIt(String act }{ ... }}

When a GAP 112 starts, the operating system assigns a positive integer number to each window (e.g., a particular GUI object 124) that identifies the order number in which a GUI object 124 takes focus when navigating through GUI screens 158. The GUI order number is represented by the private variable ElementId, which is initialized with a negative number (shown in line 2 of Table 3). The private method Locate takes the process identifier of the GAP 112 as a parameter and retrieves the ElementId for a given GUI object 124 for the GAP 112 (shown in line 3 of Table 3). When CINEMA 102 emits the code for the Locate method, CINEMA 102 uses the accessibility API functions to obtain information (e.g., the GUI object properties set 126) about GUI objects 124 in the GUI tree that lie in the path to the given GUI object 124. When CINEMA 102 executes the method Locate in the constructor (shown in lines 4-5 of Table 3), the method Locate uses the location information (e.g., the GUI object properties set 126) to navigate to the GUI object 124 and obtain the GUI object's identifier, which CINEMA 102 uses in methods setValue, getValue, and DoIt (shown in lines 6, 7 and 8 of Table 3) to access the GUI object 124.

Methods setValue and getValue (shown in lines 6 and 7 of Table 3) set and retrieve values of GUI objects 124. By default, the type of the data is string, unless the user specifies the type as integer or float. The code for setValue and getValue methods uses the accessibility API functions with the ElementId to locate the GUI object 124 in the GUI screen 158 and set or retrieve the value of the GUI object 124. The method DoIt (shown in line 8 of Table 3) takes an argument that specifies an action taken relating to the GUI object 124, and where the argument for the method DoIt is null, a default action provided by the accessibility API function is executed. CINEMA 102 generates exception handling code 164 that handles exceptions that may be thrown while controlling GAPs 112 (e.g., showing a message box informing users about incorrectly formatted input) using the methods.

In one implementation, when the user 114 completes the design of the model 154, the user 114 generates the model instructions 152 by selecting the generate model source 248 selection on the CINEMA UI 200. CINEMA 102 may prompt the user 114 to select a source code language to use in order to generate source code of a chosen language from the model 154 (514), and compile and execute the source code 152.

CINEMA binds the transcoded GUI object instructions 148 to obtain the processor executable model instructions 152 that an integrated system (e.g., 116 and 118) and/or composite integrated system 172 may execute to locate, control, and manipulate the GUI objects 124 (516). Binding GUI object classes (e.g., transcoded GUI object instructions 148) to instances of the GUI objects 124 using the operator "new" is a straightforward procedure in modern Object Oriented (00) languages such as Java™. However, the semantics of the "new" operation is complicated when the operation involves GUI objects created by GAPs. From the modeler's (e.g., user 114) perspective, GUI objects appear asynchronously and GAPs 112 change the states of the GUI objects 124 as a result of internal computations. Although, a user 114 may not specify how to manage the lifecycle of GUI objects 124 using an integrated system, a user 114 may use CINEMA 102 to deploy GUI objects 124 as programming objects (e.g., transcoded GUI object instructions 148) in the source code of integrated systems and/or composite integration systems (e.g., 172, 116, and 118).

CINEMA 102 defines bindings between programming objects (e.g., transcoded GUI object instructions 148) in models 154 and GUI objects 124. Recall that GUI objects 124 exist within the contexts of corresponding GAPs 112, and programming objects (e.g., a modeling element GUI object class 136, 222, and 234) in models 154 represent corresponding GUI objects 124. CINEMA 102 serves as a connector between models 154 and GAPs 112 that enables the programming objects to bind to respective GUI objects 124. Using CINEMA 102, the lifecycle of a programming object may be tightly linked to the lifecycle of a GUI object 124 to which the programming object represents. However, some operations do not make sense when performed on programming objects, e.g., using the operator new to create objects. Thus, bindings between programming objects (e.g., transcoded GUI object instructions 148) and GUI objects 124 determine what operations may be performed on programming objects, so that the programming objects do not throw runtime exceptions.

FIG. 6 illustrates the operations 600 that may be safely performed on a GUI object 124 of a GAP 112 as programming object. When CINEMA 102 transforms a GUI object 124 of a GAP 112 into a modeling element (e.g., 134, 216 and 218), a model 154 composed with the modeling element (e.g., 134, 216 and 218) becomes tightly connected to the GAP 112 that hosts the GUI object 124. In order to instantiate the model 154 to generate source code (e.g., model instructions 152) from the model 154, CINEMA 102 connects the GUI object classes (e.g., 136, 222 and 234) and interfaces to the corresponding GUI objects 124. CINEMA 102 considers the operations (e.g., read, write, invoke) that may be safely performed on a programming object a function of the instantiation time of the corresponding GUI object 124 and the types of bindings 602.

The 'GUI Object Instantiation Time' 604 indicates at what point in the execution of a GAP 112 the GAP 112 instantiates a GUI object 124 hosted by the GAP 112. The 'GUI Object Instantiation Time' 604 identifies three time frames, including: past 606, current 608, and future 610. A GUI object 124 may be instantiated in the past 606, which indicates that the GUI object 124 was previously available to users to perform actions on the GUI object 124 up to some point during the execution of the GAP 112. A currently available (e.g., current 608) GUI object 124 allows users to perform different actions, and some GUI object 124 may be instantiated at some point in the future 610. A user 114 may find predicting the values held by a GUI object 124 instantiated in future difficult. CINEMA 102 allows the user 114 to set the values of a GUI object 124 using programming object counterparts, so that when the GAP 112 instantiates the GUI object 124 the values of the GUI object 124 may be set.

Three types of bindings may be used, including active 612, passive 614, and static 618. The active 612 binding between a GUI object 124 and programming object indicates the GUI object 124 is activated (e.g., 406) on a GUI screen 158. In contrast, the passive 614 binding indicates the GUI object 124 is in a deactivated state (e.g., 404). The static 618 binding indicates the GUI object 124 may be considered a static variable, such as in Java™. A static variable is activated when the variable's scope is reentered. In some situations, a GUI object 124 exists on a screen that is overshadowed by another screen (e.g., layers in web browsers), and even though the GUI object 124 is not accessible by a user 114, operations may be performed on the GUI object 124. In such situations, the binding for the GUI object 124 may be considered static rather than passive.

Operations for three combinations of instantiation time and binding specifiers are prohibited, including: past and active 620; current and passive 622; and future and active 624. The symbol 'X' (e.g., 620, 622, and 624) indicates prohibited operations for particular combinations of instantiation time and binding specifiers. A GUI object 124 cannot have an active 612 binding when the GUI object was instantiated in the past 606. Similarly, a GUI object 214 instantiated at some point in time in future 610 may not have an active 612 binding. A GUI object 124 that is currently available (e.g., 608) cannot be considered passive 614.

Three types of operations may be performed on a GUI object 124, including reading values from, writing values into, and invoking methods (e.g., actions, operations and/or functions) on the GUI object 124. For a GUI object 124 instantiated in the past 606 with the passive 614 bindings, only the operation of reading the values of the GUI object 124 may be performed. When a GUI object 124 is deactivated, the values of the GUI object 124 are retrieved and stored, so that the values of the GUI object 124 may be retrieved at a later time. For a GUI object 124 instantiated in the future 610 with the passive 614 binding, only the operation of writing values to the GUI object may be performed. In other words, the values of the GUI object 124 may be set, even if the GUI object 124 is not yet instantiated by a GAP 112. The set value for the GUI object 124 may be stored so that when the GUI object 124 is created and activated, the GUI object's 124 value will be set.

Table 4 shows how CINEMA 102, in one implementation, generates a web service from a model 154.

TABLE 4

Generating a Web Service from a Model

```
/** Generate web service from model **/
    public class SmartClassesGenerator implements IRunnableWithProgress {
    private static final String BUILD_XML_TEMPLATE = TEMPLATES_DIRECTORY
+ "/build.xml.vm";
/**
    * Location of the {ServiceName}BindingImpl.java template.
    */
    private static final String CLASS_IMPL_TEMPLATE = TEMPLATES_DIRECTORY
+ "/ElementClass.java.vm";
    /**
    * The Service object used to generate a web service.
    */
    private Reference reference_ = null;
public SmartClassesGenerator(Reference reference) {
    reference_ = reference;
    }
    public void run(IProgressMonitor monitor)
                            throws InvocationTargetException, InterruptedException {
    setError(null);
    try {
        // export the service
        exportSmartClass(monitor);
    } catch (IOException e) {
        setError(new GeneratorException("Unable to export service.", e));
    }
}
/**
* Clears the generated output folder. This is needed in case we want to
* regenerate or update an existing service.
*/
private void clearFolder( ) {
    File folder = new File(getOutputFolder( ));
    if (folder.exists( )) {
        try {
            // do the equivalent of "rm -r *"
            FileUtils.deleteDirectory(folder);
        } catch (IOException e) {
            LOGGER.error("Unable to delete [" + getOutputFolder( ) + "] due to:", e);
        }
    }
    // make the empty directories
    folder.mkdirs( );
}
/**
* Creates the "build.xml" files and deploy the file.
*
* @throws IOException
*            If there is an error creating the file.
*/
```

TABLE 4-continued

Generating a Web Service from a Model

```
  private void createBuildXml( ) throws IOException {
     String filePath = getOutputFolder( );
     String fileName = "build.xml";
     createFile(filePath, fileName, BUILD_XML_TEMPLATE);
  }
  private void createFile(String folderPath, String fileName, String templateFilePath)
throws IOException {
     // make the file and create a stream
     File exportedFolder = new File(folderPath);
     exportedFolder.mkdirs( );
     File exportedFile = new File(exportedFolder.getAbsolutePath( ) + "/" +
fileName);
     exportedFile.createNewFile( );
     FileWriter fileWriter = new FileWriter(exportedFile);
     // translate the service to a Java file
//      templateEngine_.translate(reference_, fileWriter, templateFilePath);
     // cleanup and close the stream
     fileWriter.flush( );
     fileWriter.close( );
     // debug
     LOGGER.debug("Exported  service's  binding  implementation  to:  [" +
exportedFile.getAbsolutePath( ) + "]");
  }
```

Table 5 shows how CINEMA 102, in one implementation, generates Java™ code from the GUI object class.

TABLE 5

An example of Creating Java ™ code from the GUI Object Class

```
private void createJavaImplementation( ) throws IOException {
   for (SmartClass theClass : reference_.getSmartClasses( )) {
       String packageDirectory = theClass.getPackageName( ).replace(".", "/");
       LOGGER.debug("write to package:" + packageDirectory);
     for (DragAndDrop element : theClass.getDragAndDropElements( )) {
         String filePath = getOutputFolder( ) + "/src/" + packageDirectory + "/";
         String fileName = element.getAlias( ) + ".java";
         LOGGER.debug("the     file     is     written     to     :     "     +
System.getProperty("user.dir") + "\\" + filePath + "\\" + fileName);
         createElementClass(filePath,    fileName,    theClass,    element,
CLASS_IMPL_TEMPLATE);
     }
    }
  }
  private void createElementClass (String folderPath, String fileName, SmartClass
theClass, DragAndDrop element, String templateFilePath) throws IOException {
// make the file and create a stream
     File exportedFolder = new File(folderPath);
     exportedFolder.mkdirs( );
     File exportedFile = new File(exportedFolder.getAbsolutePath( ) + "/" +
fileName);
     exportedFile.createNewFile( );
     FileWriter fileWriter = new FileWriter(exportedFile);
     LOGGER.debug("write to file: " + exportedFile.getAbsolutePath( ));
//         createElementJavaFile(fileWriter, theClass, element);
         templateEngine_.translate(theClass, element, fileWriter, templateFilePath);
     // cleanup and close the stream
     fileWriter.flush( );
     fileWriter.close( );
     // debug
     LOGGER.debug("Exported  service's  binding  implementation  to:  [" +
exportedFile.getAbsolutePath( ) + "]");
  }
```

Table 6 shows how CINEMA 102, in one implementation, generates XML for a GAP 112.

TABLE 6

Generating XML from a GAP

```
/**
 * Converts a GAP (e.g., state machine) into XML.
 */
private void createStateMachineXml( ) {
    String filePath = getOutputFolder( );
    if (reference__.getSmartClasses( ) != null) {
        for (SmartClass theClass : reference__.getSmartClasses( )) {
            if (theClass.getStateMachines( ) != null) {
                for (ApplicationStateMachine stateMachine : theClass.getStateMachines( )) {
                    String fileName = "stateMachine-" + theClass.getName( ) + "-"
                        + stateMachine.getApplication( ).getAlias( ) + ".xml";
                    try {
                        // make the file and create a stream
                        File exportedFolder = new File(filePath);
                        exportedFolder.mkdirs( );
                        File exportedFile = new File(exportedFolder.getAbsolutePath( ) + "/"
                            + fileName);
                        exportedFile.createNewFile( );
                        FileOutputStream fileOutputStream =
                                    new FileOutputStream(exportedFile);
                        // translate the state machine to an xml file
                        StateMachineWriter stateMachineWriter =
                                    new StateMachineWriter( );
                        stateMachineWriter.write(stateMachine, fileOutputStream);
                        // cleanup and close the stream
                        fileOutputStream.flush( );
                        fileOutputStream.close( );
                        // debug
                        LOGGER.debug("Exported state machine for operation [" +
                            theClass.getName( ) + "] to: ["
                                + exportedFile.getAbsolutePath( ) + "]");
                    } catch (IOException e) {
                        LOGGER.error("Unable to state machine due to:", e);
                    }
                }
            }
        }
    }
}
private void createReplayScript( ) throws IOException{
    String filePath = getOutputFolder( ) + "/src/" +
        reference__.getPackageName( ).replace(".", "/") + "/ReplayScript" ;
    File exportedFolder = new File(filePath);
    exportedFolder.mkdirs( );
    File exportedFile = new File(exportedFolder.getAbsolutePath( ) + "/" +
        "ReplayScriptAdvisor.java");
    exportedFile.createNewFile( );
    FileWriter fileWriter = new FileWriter(exportedFile);
    templateEngine__.translate(reference__, fileWriter,
                                        REPLAYSCRIPT_IMPL_TEMPLATE);
    // cleanup and close the stream
    fileWriter.flush( );
    fileWriter.close( );
}
private void exportSmartClass(IProgressMonitor monitor) throws
InterruptedException, IOException {
    if (reference__ != null) {
        templateEngine__ = new VelocityTemplateEngine( );
        try {
            // create all of the steps
            steps__ = new LinkedList<String>( );
            steps__.add("Cleaning output...");
            steps__.add("Creating Java implementation");
//          steps__.add("Generating State Machine for each operation");
            //steps__.add("Creating Ant file");
            steps__.add("Creating Replay Script");
//          steps__.add("Copying dependencies and SMART framework");
            steps__.add("Complete!");
            monitor.beginTask("Exporting SMART Class \"" + reference__.getName( ) +
"\"", steps__.size( ));
            // clear the existing generated files (if any)
            step(monitor);
            clearFolder( );
            // create the java implementation
            step(monitor);
            createJavaImplementation( );
            // generating state machine xml
```

TABLE 6-continued

Generating XML from a GAP

```
//      step(monitor);
//      createStateMachineXml( );
        // copy the build.xml to the new service folder
        step(monitor);
        //createBuildXml( );
        createReplayScript( );
        // set marker to done
        step(monitor);
      } catch (IOException e) {
        throw e;
      } finally {
        monitor.done( );
      }
    }
  }
}
```

FIG. 7 shows the measurements 700 for the effort expended to create web services using CINEMA 102 compared with the programming effort expended to create an identical service using the source code of GAPs 112. Consider two commercial GAPs: expense accounting (EA) GAP, and invoices and estimates (InE) GAP. The EA GAP and InE GAP are closed and monolithic GAPs 112 that run on MS-Windows™. InE allows users to create and print invoices, estimates, and statements, and to track customer payments and unpaid invoices. CINEMA 102 allows a user to create models and web services for GAPs 112 without writing any additional code, modifying the applications, or accessing their proprietary data stores. Since EA and InE are closed and monolithic commercial applications that neither expose any programming interfaces nor publish their data in known formats, CINEMA 102 may be used to create web services from the GAPs 112 using basic information about how users interact with the GAPs 112 to accomplish tasks.

The measurements 700, refer to one example implementation of CINEMA 102, that included Windows XP Pro™ on a computer with Intel Pentium™ IV 3.2 GHz CPU and 2 GB of RAM. The 'GAP name state no.' 702 column lists the names of the GAPs (e.g., 704) and the comma-separated GAP state identifier 706 that is the sequence number of the GUI screens 158. The visible, invisible and used columns (e.g., 708, 710 and 712), shown under the 'number of GUI elements' 714, indicate the number of visible and invisible GUI elements (e.g., GUI objects 124) and the number of GUI elements including the parents of the GUI elements in the hierarchy that were used as parameters and/or action targets in web services. The state XML bytes column 716 illustrates the size of the XML generated by CINEMA 102 to describe the given state of the GAP 112. The time sec column 718 illustrates the amount of time taken to generate and parse the state XML.

The effort required to create web services using CINEMA 102 was compared with the programming effort to create the same service by using the source code of GAPs 112. An application was built with accounting functionality. Using approximately nine hours to create and test the accounting GAP. Then, a web service was created using Microsoft™ Visual Studio 2005, which has the state-of-the-art support for automating tasks for building web services. Within approximately one hour the user extracted the code from the accounting GAP, moved the code to the web service project, and compiled and debugged the code using the Studio. In contrast to the above scenarios, using CINEMA 102, a user spent less than ten minutes to generate a web service.

Alternatives to CINEMA 102 include the UniFrame™ framework is a framework for building integrated systems by assembling pre-developed heterogeneous and distributed software components. The glue/wrapper code that realizes the interoperation among distributed and heterogeneous software components can be generated from a descriptive model. However, the UniFrame™ framework requires users to write code for models and possess the knowledge of the source code of components.

In another approach, a web browser-shell approach, a modeler may use a web browser-shell that integrates a command interpreter into the browser's location box to automate HTML interfaces. A browser-shell wraps legacy CLPs with an HTML/CGI graphical interface. The web browser-shell approach depends heavily upon parsing HTML and extracting data from the command line input/output.

Code patching and binary rewriting techniques modify the binary code of executable programs in order to control and manipulate them when integrating these programs into composite systems. However, code patching and binary rewriting techniques are platform-dependent and require programmers to write complicated code to change program executables. Programmers find using code patching and binary rewriting techniques difficult and error prone, and often cause applications to become unstable and crash.

Extracting information from GAPs and GUI elements, using the various other unworkable techniques may be referred to as screen-scraping. Macro recorders use this technique by recording the user's mouse movements and keystrokes, then playing them back by inserting simulated mouse and keyboard events in the system queue.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

What is claimed is:

1. An article of manufacture, comprising:
    a non-transitory computer readable medium; and
    instructions stored on the non-transitory computer readable medium that when executed by a processor cause the processor to modify a modeling element palette of a modeling tool by:
        configuring the modeling tool to operate with a graphical user interface (GUI) application (GAP) in a user selected isolation mode that defines whether or not the GAP and the modeling tool run in a same process space, where the user selected isolation mode is based on the GAP;
        receiving a graphical user interface (GUI) object definition of a GUI object selected in the GUI application (GAP) external to the modeling tool;
        generating a GUI modeling element compatible with the modeling tool from the GUI object definition; and
        adding the GUI modeling element into the modeling element palette.

2. The article of manufacture of claim 1, where receiving comprises:
    receiving a GUI object definition comprising any combination of:
        geometry information that locates the GUI object in the GAP;
        access constraints for the GUI object in the GAP; and
        input or output parameters for the GUI object.

3. The article of manufacture of claim 1, where generating comprises: transcoding the GUI object definition to obtain a modeling element representation for the GUI modeling element.

4. The article of manufacture of claim 1, where receiving comprises:
    receiving a GUI object definition comprising any combination of:
        a GUI object access method for performing an operation on the GUI object; and
        GUI object navigation information specifying how to reach the GUI object in the GAP.

5. The article of manufacture of claim 4, where the GUI object navigation information comprises a screen sequence for reaching the GUI object from a selected state of the GAP.

6. The article of manufacture of claim 1, where receiving comprises: receiving the GUI object definition through an accessibility layer and a hook into the GAP.

7. A system comprising:
    a processor; and
    a memory coupled to the processor, the memory comprising instructions that when executed by the processor cause the processor to modify a modeling element palette of a modeling tool by:
        configuring the modeling tool to operate with a graphical user interface (GUI) application (GAP) in a user selected isolation mode that defines whether or not the GAP and the modeling tool run in a same process space, where the user selected isolation mode is based on the GAP;
        receiving a graphical user interface (GUI) object definition of a GUI object selected in a GUI application (GAP) external to the modeling tool;
        generating a GUI modeling element compatible with the modeling tool from the GUI object definition; and
        adding the GUI modeling element into the modeling element palette.

8. The system of claim 7, where the GUI object definition comprises any combination of:
    geometry information that locates the GUI object in the GAP;
    access constraints for the GUI object in the GAP; and
    input or output parameters for the GUI object.

9. The system of claim 7, where the instructions that cause the processor to generate the GUI modeling element transcode the GUI object definition to obtain a modeling element representation for the GUI modeling element.

10. The system of claim 7, where the GUI object definition comprises any combination of:
    receiving a GUI object definition comprising any combination of:
        a GUI object access method for performing an operation on the GUI object; and
        GUI object navigation information specifying how to reach the GUI object in the GAP.

11. The system of claim 10, where the GUI object navigation information comprises a screen sequence for reaching the GUI object from a selected state of the GAP.

12. The system of claim 7, where the memory further comprises:
    an accessibility layer and a hook into the GAP through which the GUI object definition is received.

13. A method comprising:
    configuring a modeling tool to operate with a graphical user interface (GUI) application (GAP) in a user selected isolation mode that defines whether or not the GAP and the modeling tool run in a same process space, where the user selected isolation mode is based on the GAP;
    receiving a graphical user interface (GUI) object definition of a GUI object selected in the GUI application (GAP) external to the modeling tool;
    generating a GUI modeling element compatible with the modeling tool from the GUI object definition; and
    adding the GUI modeling element into the modeling element palette.

14. The method of claim 13, where receiving comprises:
    receiving a GUI object definition comprising any combination of:
        geometry information that locates the GUI object in the GAP;
        access constraints for the GUI object in the GAP; and
        input or output parameters for the GUI object.

15. The method of claim 13, where generating comprises:
transcoding the GUI object definition to obtain a modeling element representation for the GUI modeling element.

16. The method of claim 13, where receiving comprises:
receiving a GUI object definition comprising any combination of:
  a GUI object access method for performing an operation on the GUI object; and
  GUI object navigation information specifying how to reach the GUI object in the GAP.

17. The method of claim 16, where the GUI object navigation information comprises a screen sequence for reaching the GUI object from a selected state of the GAP.

18. The method of claim 13, where receiving comprises:
receiving the GUI object definition through an accessibility layer and a hook into the GAP.

* * * * *

UNITED STATES PATENT AND TRADEMARK OFFICE
CERTIFICATE OF CORRECTION

PATENT NO. : 8,479,150 B2  
APPLICATION NO. : 12/540739  
DATED : July 2, 2013  
INVENTOR(S) : Mark Grechanik et al.

Page 1 of 1

It is certified that error appears in the above-identified patent and that said Letters Patent is hereby corrected as shown below:

In the Specification

In column 23, line 67, after "in modern Object Oriented" replace "(00)" with --(OO)--.

Signed and Sealed this  
Seventeenth Day of September, 2013

Teresa Stanek Rea  
*Deputy Director of the United States Patent and Trademark Office*